United States Patent
Howard et al.

(10) Patent No.: US 11,985,259 B2
(45) Date of Patent: May 14, 2024

(54) UNIFIED MULTI-DIE PHYSICAL UNCLONABLE FUNCTION

(71) Applicant: RAYTHEON COMPANY, Waltham, MA (US)

(72) Inventors: Jennifer E. Howard, Prosper, TX (US); Colby K. Hoffman, Fairview, TX (US); Edward Escandon, McKinney, TX (US); Albert D. Marzullo, Plano, TX (US); Ross MacKinnon, McKinney, TX (US); Maegen A. Forrer, Farmersville, TX (US)

(73) Assignee: RAYTHEON COMPANY, Waltham, MA (US)

( * ) Notice: Subject to any disclaimer, the term of this patent is extended or adjusted under 35 U.S.C. 154(b) by 428 days.

(21) Appl. No.: 17/357,067

(22) Filed: Jun. 24, 2021

(65) Prior Publication Data

US 2022/0417041 A1 Dec. 29, 2022

(51) Int. Cl.
*H04L 9/32* (2006.01)
*H04L 9/08* (2006.01)

(52) U.S. Cl.
CPC .......... *H04L 9/3278* (2013.01); *H04L 9/0866* (2013.01); *H04L 2209/12* (2013.01)

(58) Field of Classification Search
CPC .................. H04L 9/3278; H04L 2209/12
See application file for complete search history.

(56) References Cited

U.S. PATENT DOCUMENTS

| | | |
|---|---|---|
| 8,516,269 B1 | 8/2013 | Hamlet et al. |
| 8,848,905 B1 | 9/2014 | Hamlet et al. |
| 10,366,253 B2 | 7/2019 | Plusquellic |
| 10,868,535 B2 | 12/2020 | Plusquellic et al. |
| 2011/0215829 A1 | 9/2011 | Guajardo Merchan et al. |
| 2013/0047209 A1 | 2/2013 | Satoh et al. |
| 2013/0082733 A1* | 4/2013 | Shimizu ............... H04L 9/3278 326/8 |
| 2013/0276059 A1 | 10/2013 | Lewis et al. |

(Continued)

FOREIGN PATENT DOCUMENTS

EP 3690867 A1 8/2020

OTHER PUBLICATIONS

International Search Report and Written Opinion issued in International Application No. PCT/US2022/034627; Application Filing Date Jun. 23, 2022; Date of Mailing Oct. 18, 2022 (17 pages).

*Primary Examiner* — Eric W Shepperd
(74) *Attorney, Agent, or Firm* — CANTOR COLBURN LLP

(57) ABSTRACT

A multi-die device a first die containing a plurality of first die signal path elements configured to propagate a stimulus signal and a second die containing a plurality of second die signal path elements configured to propagate the stimulus signal. The multi-die device further includes an interposer configured to establish signal communication between the first die and the second die so as to deliver the stimulus signal from the plurality of first die signal path elements to the plurality of second die signal path elements to generate a propagation delay. The propagation delay is used to generate a single unified PUF response that is indicative of the authenticity of the multi-die device.

6 Claims, 6 Drawing Sheets

(56) References Cited

U.S. PATENT DOCUMENTS

| | | | |
|---|---|---|---|
| 2014/0108786 A1* | 4/2014 | Kreft | G06Q 20/3825 |
| | | | 713/194 |
| 2015/0269378 A1* | 9/2015 | Falk | H04L 63/105 |
| | | | 726/6 |
| 2018/0176025 A1 | 6/2018 | Suresh et al. | |
| 2019/0028283 A1 | 1/2019 | Sharifi et al. | |
| 2019/0068383 A1* | 2/2019 | Wang | G11C 7/24 |
| 2019/0305970 A1* | 10/2019 | Satpathy | H04L 9/006 |
| 2021/0385094 A1* | 12/2021 | Yu | H04L 9/0869 |

* cited by examiner

UNIFIED MULTI-DIE PHYSICAL UNCLONABLE FUNCTION

GOVERNMENT LICENSE RIGHTS

This disclosure was made with Government support under FA8650-20-C-1917 awarded by CRAD (Contract Research and Development). The Government has certain rights in the disclosure.

BACKGROUND

The present disclosure relates to supply chain risk management, and more specifically, a device including an anti-counterfeiting fingerprint.

Supply chains transform components and raw materials into a finished product or device. Often times a component or device is provided to several different supply chain entities across the globe before a finished product enters into service or is offered for consumer purchase. As a result, the product or device may be susceptible to malicious insertion and/or sub-components can be substituted with counterfeit components.

Counterfeit components can have inferior specifications and quality. A counterfeit device may also be loaded with unauthorized malware that gathers information or compromises the function of the product unbeknown to the product owner. Accordingly, there is a need for improved techniques for establishing component provenance and tracking their pedigree as they move through a supply chain to reduce the risk of counterfeit components getting integrated into the supply chain's finished product.

SUMMARY

According to one embodiment, a multi-die device includes plurality of dies. Each die provides an entropy source. A first physical unclonable function (PUF) response produced by a first entropy source of a first die among the plurality of dies is combined with a second PUF response produced by a second entropy source of a second die among the plurality of dies to generate a single unified physical unclonable function (PUF) response that is indicative of the authenticity of each die within the multi-die device.

According to another embodiment, a method of authenticating a multi-die device is provided. The method comprises producing a first PUF response by a first entropy source in the first die among a plurality of dies, and producing a second PUF response by a second entropy source in the second die among the plurality of dies. The method further comprises combining the first PUF response with the second PUF response to generate a single unified physical unclonable function (PUF) response that is indicative of the authenticity of the multi-die device.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
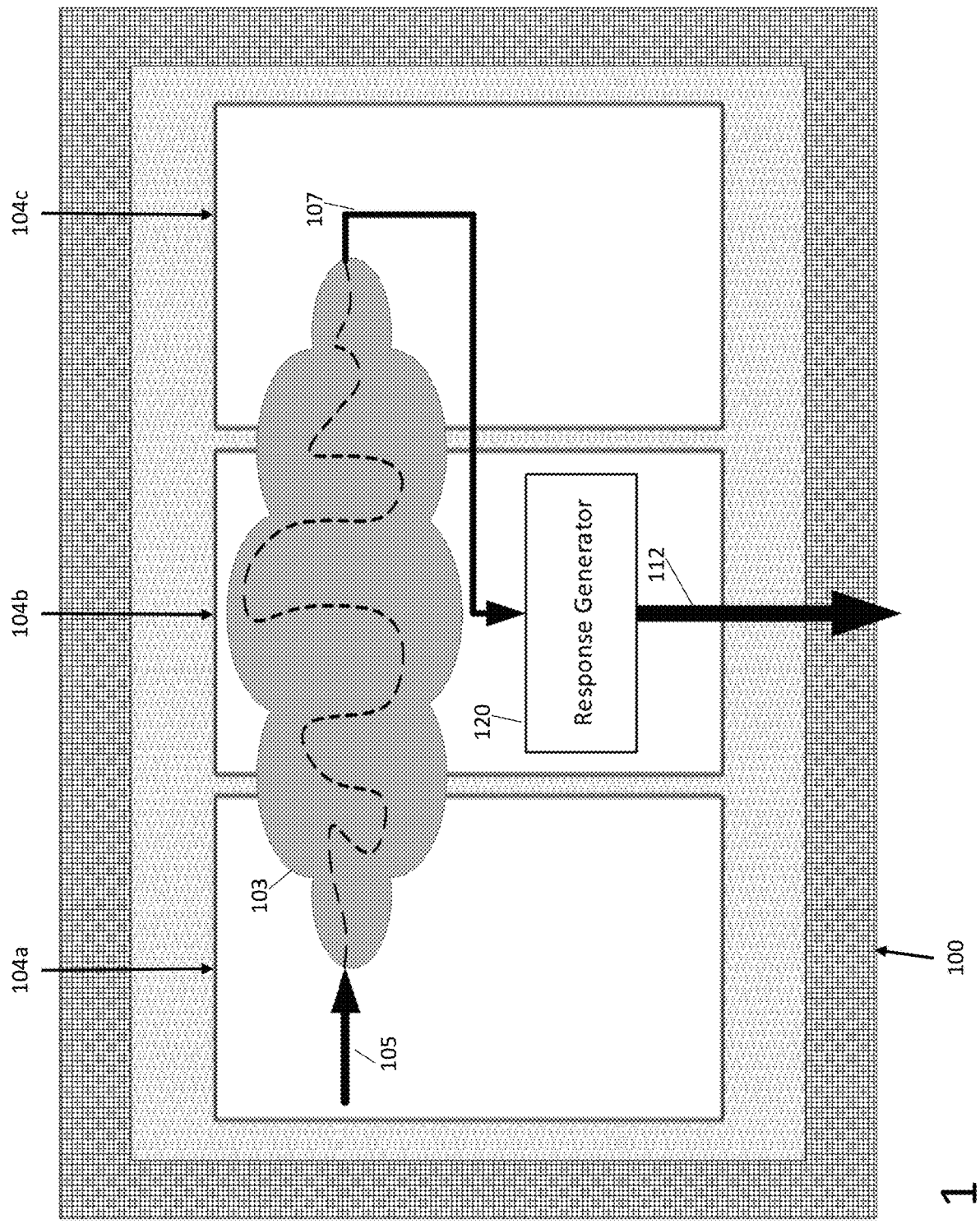
FIG. 1 is a block diagram illustrating a homogenous multi-die electronic device configured to utilize entropy that is spread across multiple dies according to a non-limiting embodiment.

Physical unclonable functions (PUFs) have been developed to address electronic device counterfeiting, and in particular semiconductor device counterfeiting. PUFs are capable of providing a "digital fingerprint," which serves as a unique identifier for the device intended for protection. A PUF response, i.e., digital fingerprint, can be generated based upon miniscule physical characteristics that are unique to a particular semiconductor device. Accordingly, it is possible to differentiate a counterfeit semiconductor device from an authentic semiconductor device based on the PUF's corresponding digital fingerprint.

Traditionally, only the individual digital fingerprint corresponding to a particular PUF is used to identify a single die. However, recent innovations in mobile device technologies and the reduction in electronic device packaging have led to the increased usage of system-in-package (SiP) designs, also referred to as Multi-Chip Modules (MCMs), or simply a multi-die device. A SiP employs multiple dies, with each die including several integrated circuits which can be enclosed in one or more chip carrier packages.

As advanced packaging devices become more prevalent in global supply chains crossing multiple nations, the need to protect the SiPs has increased. However, there currently exists no authentication techniques that adequately confirm the identity and authenticity of each die employed in a SiP or the SiP as a whole. Current PUF techniques applied to SiPs involve considering the entropy of one die within the package.

Various non-limiting embodiments described herein provide a unified multi-die PUF, which can be applied to either a homogenous multi-die electronic device including several dies of the same type or a heterogeneous multi-die electronic device including several different types of dies. According to a non-limiting embodiment, a homogeneous multi-die PUF utilizes an entropy source that is spread across multiple die of the same type included in a single multi-die device. The entropy source is quantified by measuring propagation delay along signal paths included in the dies of a multi-die device. Spreading the PUF across all the dies forces some of the paths to traverse between two or more die, and through the interposer connecting the die. In this manner, the entropy from each die and the interposer are utilized together to generate a single unified response for the homogenous multi-die electronic device.

According to additional non-limiting embodiments, a homogeneous or heterogeneous multi-die PUF instantiates individual PUFs in each die within a multi-die device. Each PUF is tailored for the type of device in which it is instantiated. For example, the PUF employed in an FPGA die is different than the PUF employed in a processor die, which is different than the PUF employed in a memory die. The individual responses from each PUF are cryptographically bound together using a hash function, for example, to create a single unified response for the multi-die device.

With reference now to FIG. 1, a homogenous multi-die electronic device 100 is illustrated according to a non-limiting embodiment. The homogenous multi-die electronic device 100 is constructed as a SiP and employs three die 104a, 104b, and 104c of the same type, for example. Although three die 104a, 104b, and 104c are employed, it should be appreciated that more or less die can be employed without departing from the scope of the present disclosure.

The homogenous multi-die electronic device 100 utilizes a distributed entropy source 103 spread across the die 104a, 104b, 104c. The distributed entropy source 103 can be quantified by applying a challenge 105 (e.g., one or more stimulus signals) to the homogenous multi-die electronic device 100 and measuring the propagation delay of the challenge across all the die 104a, 104b, 104c included in the device 100. In at least one non-limiting embodiment, the distributed entropy source 103 can be defined by the combination of a first set of integrated circuits located in the first die 104a, a second set of integrated circuits located in a second die 104b, and a third set of integrated circuits located in a third die 104c. Accordingly, the distributed entropy source 103 combines the propagation of the challenge across all the die 104a, 104b, 104c to produce one or more measured timing results 107. In at least one non-limiting embodiment, the timing result(s) 107 can be processed by a response generation logic 120. The output of the response generation logic 120 can be utilized as a unified PUF response 112 indicating the authenticity of the homogenous multi-die electronic device 100.

Figure 2A:
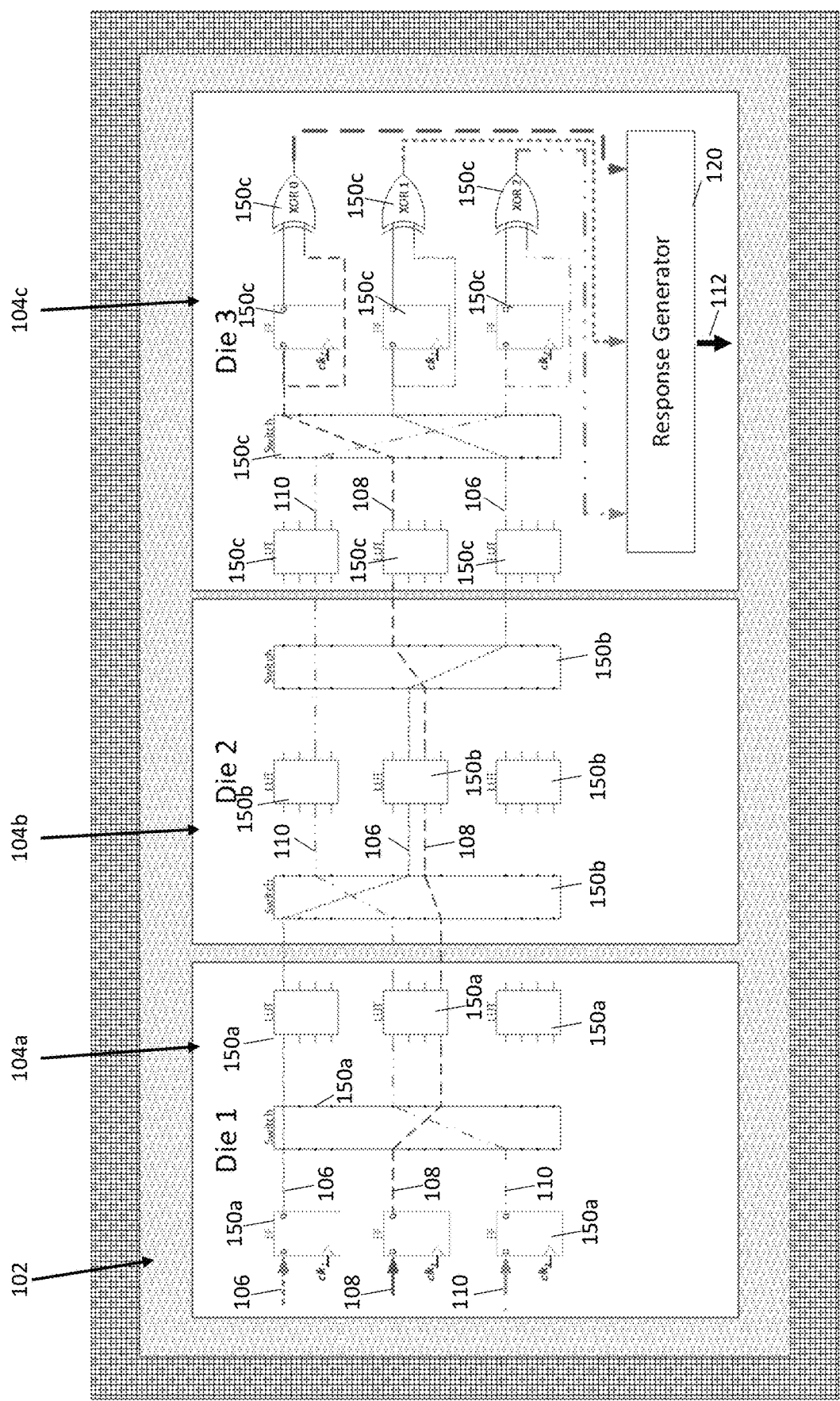
FIG. 2A is a block diagram illustrating a homogenous multi-die electronic device configured to utilize entropy that is spread across multiple dies using a first plurality of signal paths according to a non-limiting embodiment.
Figure 2B:
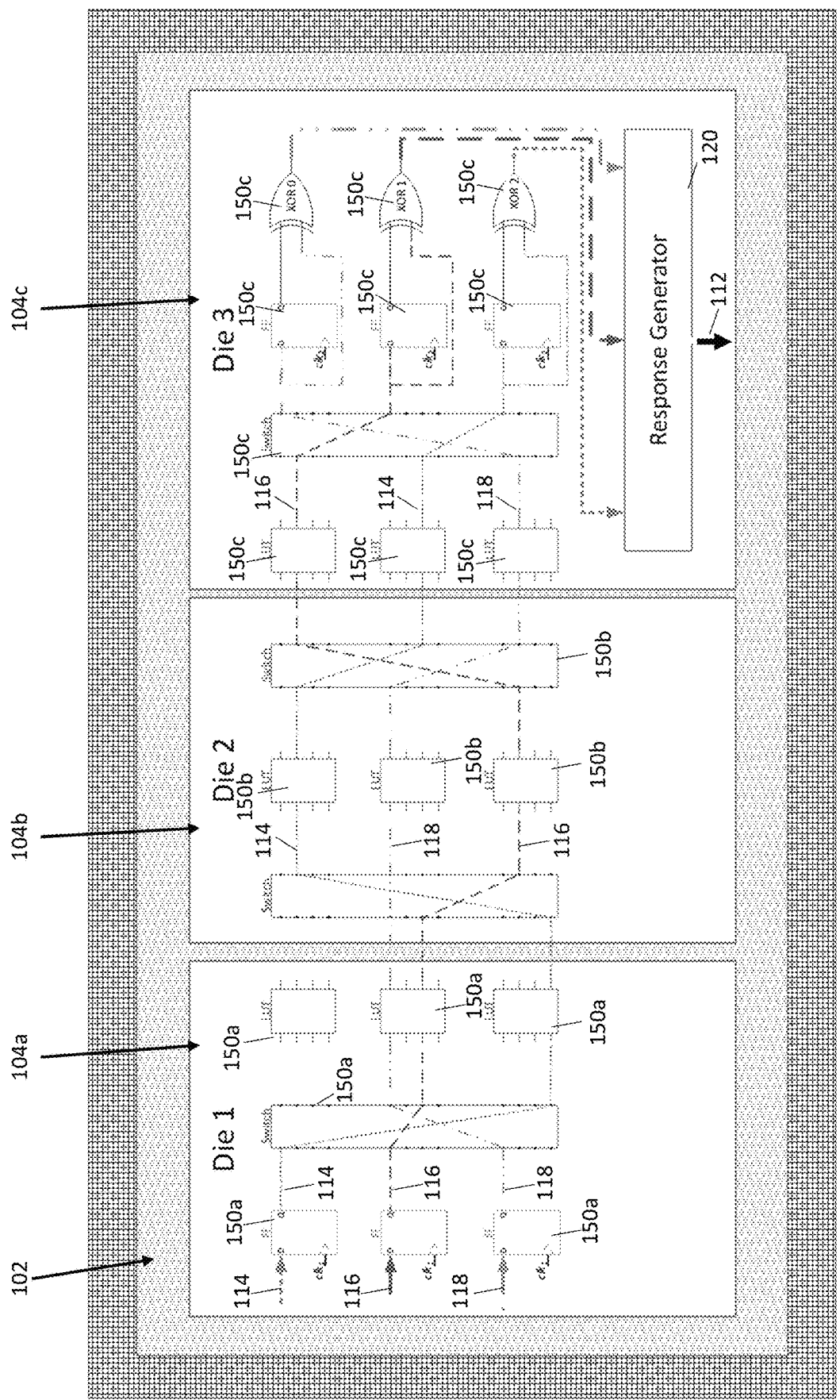
FIG. 2B is a block diagram illustrating a homogenous multi-die electronic device configured to utilize entropy that is spread across multiple dies using a second plurality of signal paths according to a non-limiting embodiment.

Turning now to FIGS. 2A and 2B, a homogenous multi-die electronic device 100 is illustrated according to a non-limiting embodiment. The unified PUF response that is instantiated in the homogenous multi-die electronic device 100 described in FIGS. 2A and 2B may be referred to as a "strong PUF", which utilizes a plurality of different timing measurements produced in response to a different challenges. The plurality of different timing measurements are then used to generate a unified PUF response 112 indicating the authenticity of the homogenous multi-die electronic device 100.

The homogenous multi-die electronic device 100 can be configured as a SiP, which implements an interposer 102 configured to support multiple die 104a, 104b and 104c of the same type. Although the multi-die electronic device 100 is shown implementing three dies 104a, 104b and 104c, it should be appreciated that the number of dies is not limited thereto, and more or less dies can be implemented without departing from the scope of the present disclosure. The interposer 102 can include one or more substrate layers and can facilitate electrical interface routing from one die or external connection to another. For example, the interposer 102 can facilitate an electrical interface connection between one or more of the integrated circuits on dies 104a, 104b and 104c to the integrated circuits on another die or to an external packaging pin included in the homogenous multi-die electronic device 100.

Each die 104a, 104b and 104c contains integrated circuits that include a plurality of individual signal path elements 150a, 150b and 150c. The signal path elements 150a, 150b and 150c include, but are not limited to, interconnecting signal traces, logic gates, switches, and/or look-up tables (LUTs). Accordingly, a given combination of signal path elements establishes a full signal path extending across all dies 104a, 104b and 104c. For example: die 104a contains integrated circuits including individual signal path elements 150a; die 104b contains integrated circuits including individual signal path elements 150b; and die 104c contains integrated circuits including individual signal path elements 150c. The interposer 102 is configured to connect the integrated circuits of dies 104a, 104b and 104c together with one another. Accordingly, a multitude of different signal paths can be established that extend across all the dies 104a, 104b and 104c included in the homogenous multi-die electronic device 100. Each of the established signal paths can therefore propagate a challenge (e.g., one or more stimulus signals) through the interposer and across the all three die 104a, 104b and 104c.

The inherent manufacturing variations of the individual signal path elements 150a, 150b and 150c (e.g., the signal traces, logic gates, switches, and/or LUTs) included in a given die 104a, 104b and 104c produce an entropy source for the corresponding die. These manufacturing variations can be quantified by measuring propagation delays along a selected signal path and/or a selected combination of signal paths. In one or more non-limiting embodiments, the measured propagation delay also takes into account propagation delays contributed by manufacturing variations of the interposer 102 (e.g., wired connections, soldering connections and/or substrate layer materials). At the initial time the homogenous multi-die electronic device 100 is fabricated, the propagation delays resulting from all signal paths and combinations thereof can be measured and used to create a unified PUF response 112. Accordingly, the unified PUF response 112 can be regenerated at later stages in the supply chain indicating the authenticity of the homogenous multi-die electronic device 100.

Referring to FIG. 2A, for example, the homogenous multi-die electronic device 100 utilizes an entropy source that is spread across each individual die 104a, 104b and 104c to a first plurality of different signal paths to generate a first timing response. In FIG. 2A, a first challenge defined by a first set of stimulus signals 106, 108 and 110 is applied to die 104a. The stimulus signals 106, 108 and 110 can be provided by an internal controller (not shown) or an external querying device (not shown). Each stimulus signal 106, 108 and 110 travels through the individual signal path elements 150a, 150b and 150c defining the respective signal paths that extend across each of the dies 104a, 104b and 104c.

For example, stimulus signal 106 travels through a first signal path established using a combination of signal traces, logic gates, switches, and/or LUTs connected by path segments contained in each of the dies 104a, 104b and 104c. In other words, stimulus signal 106 propagates through a signal path that can be defined by a first combination of first die signal path elements 150a in the first die 104a, a first combination of second die signal path elements 150b in the second die 104b, and a first combination of third die signal path elements 150c in the third die 104c. As described herein, the second stimulus signal 108 propagates through a signal path that can be defined by a second combination of first die signal path elements 150a in the first die 104a, a second combination of second die signal path elements 150b in the second die 104b, and a second combination of third die signal path elements 150c in the third die 104c. Similarity, a third stimulus signal 110 propagates through a signal path that can be defined by a third combination of first die signal path elements 150a in the first die 104a, a third combination of second die signal path elements 150b in the second die 104b, and a third combination of third die signal path elements 150c in the third die 104c. The propagation delays of stimulus signals traveling through the respective signal paths starting from die 104a and ending at die 104c produce timing results which are output from die 104c. The timing results from all the paths are used to obtain a first unified PUF response 112.

Referring to FIG. 2B, a second challenge defined by a second set of stimulus signals 114, 116 and 118 is applied to die 104a. In this example, the second set of stimulus signals 114, 116, and 118 are delivered through a different combination of signal path elements 150a, 105b and 150c (e.g., signal traces, logic gates, switches, and/or LUTs) contained in the dies 104a, 104b and 104c so as to define a different set of signal paths compared to the first set of signal paths shown in FIG. 2A. In other words, stimulus signal 114 propagates through a signal path that can be defined by a fourth combination of first die signal path elements 150a in the first die 104a, a fourth combination of second die signal path elements 150b in the second die 104b, and a fourth combination of third die signal path elements 150c in the third die 104c. The second stimulus signal 116 propagates through a signal path that can be defined by a fifth combination of first die signal path elements 150a in the first die 104a, a fifth combination of second die signal path elements 150b in the second die 104b, and a fifth combination of third die signal path elements 150c in the third die 104c. Similarity, the third stimulus signal 118 propagates through a signal path that can be defined by a sixth combination of first die signal path elements 150a in the first die 104a, a sixth combination of second die signal path elements 150b in the second die 104b, and a sixth combination of third die signal path elements 150c in the third die 104c. The propagation delays of stimulus signals traveling through the respective signal paths starting from die 104a and ending at die 104c produces timing results which are again output from die 104c. The timing results from all the paths are used to obtain a second different unified PUF response 112.

Figure 3:
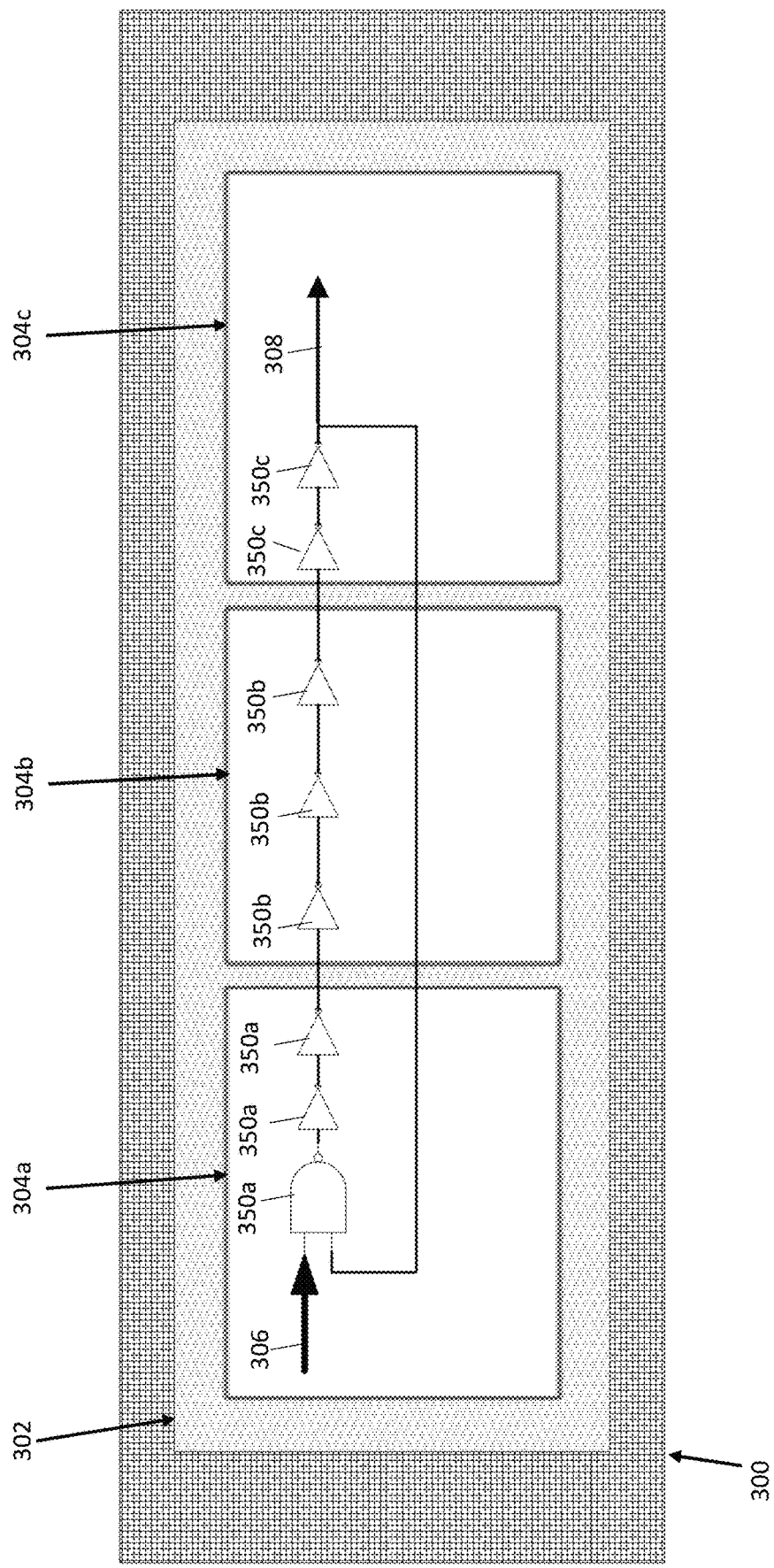
FIG. 3 is a block diagram illustrating a homogenous multi-die electronic device configured to utilize entropy that is spread across multiple dies using a single plurality of signal paths according to another non-limiting embodiment.

Turning now to FIG. 3, a homogenous multi-die electronic device 300 is illustrated according to another non-limiting embodiment. The homogenous multi-die electronic device 300 includes multiple die 304a, 304b and 304c of the same type. In this example, the unified PUF response instantiated in the homogenous multi-die electronic device 300 can be referred to as a "weak PUF", which utilizes a single challenge 306 to generate a single timing result 308 used to measure the entropy source that is spread across the individual dies 304a, 304b, and 304c. The challenge 306 is propagated through a plurality of first die signal path elements 350a included in the first die 304a, a plurality of second die signal path elements 350b included in the second die 304b, and a plurality of third die signal path elements 350c included in the third die 304c. The interposer 302 facilitates connection between the signal path elements 350a, 350b and 350c. In this manner, the single challenge signal 306 is applied to die 304a and is propagated through each of the signal path elements 350a, 350b and 350c and thus across all the die 304a, 304b and 304c to produce a timing result 308 which can be utilized as a unified PUF response 308.

Figure 4:
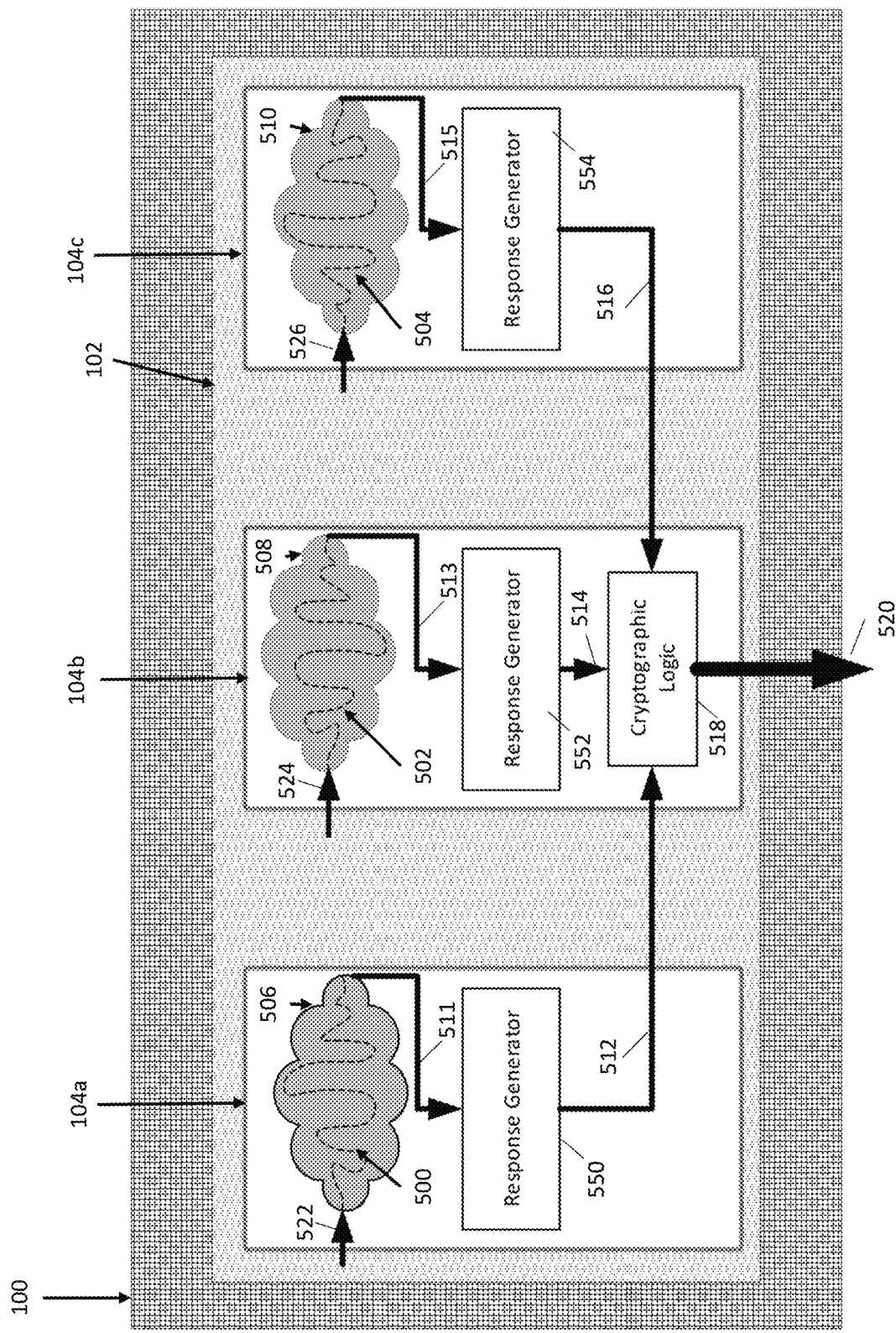
FIG. 4 is a block diagram illustrating homogenous multi-die electronic device configured to produce multiple independent PUF responses used to generate a single unified PUF response according to a non-limiting embodiment.

Turning now to FIG. 4, a homogenous multi-die electronic device 100 configured to produce multiple independent PUF responses used to generate a unified PUF response is illustrated according to a non-limiting embodiment. The homogenous multi-die electronic device 100 includes a plurality of dies 104a, 104b and 104c, with each die 104a, 104b and 104c containing a plurality of signal path elements that define one or more local signal paths 500, 502 and 504. As described herein, an individual entropy source 506, 508, and 510 associated with each respective die 104a, 104b and 104c is quantified by measuring a propagation delay along the local signal paths 500, 502 and 504 to produce timing results 511, 513 and 515 associated with a respective die 104a, 104b and 104c. In at least one non-limiting embodiment, the timing results 511, 513 and 515 can be processed by response generation logic units 550, 552 and 554, respectively. Each response generation logic units 550, 552 and 554 outputs an individual PUF response 512, 514 and 516, which can then be used to generate a single unified PUF response 520.

According to the non-limiting embodiment shown in FIG. 4, each die 104a, 104b and 104c produces individual timing results 512, 514 and 516 in response to receiving a respective challenge 522, 524 and 526. Because each die 104a, 104b and 104c receives a respective challenge 522, 524 and 526, the resulting timing results 512, 514, 516 are generated independently from one another. As described, an individual challenge 522, 524 and 526 can include one or more stimulus signals. The timing results 511, 513 and 515 for a given die 104a, 104b and 104c are delivered to a respective response generator 550, 552 and 554, which generates the individual PUF responses 512, 514 and 516 corresponding to the respective die 104a, 104b and 104c. The individual responses 512, 514, 516 are then cryptographically bound together (i.e., combined) using a cryptographic logic circuit 518 such as a Secure Hash Algorithm (SHA), for example, to generate a single unique response 520. As described herein, the single response 520 can serve as a single unified PUF response 520 indicating the authenticity of the homogenous multi-die electronic device 100.

Figure 5:
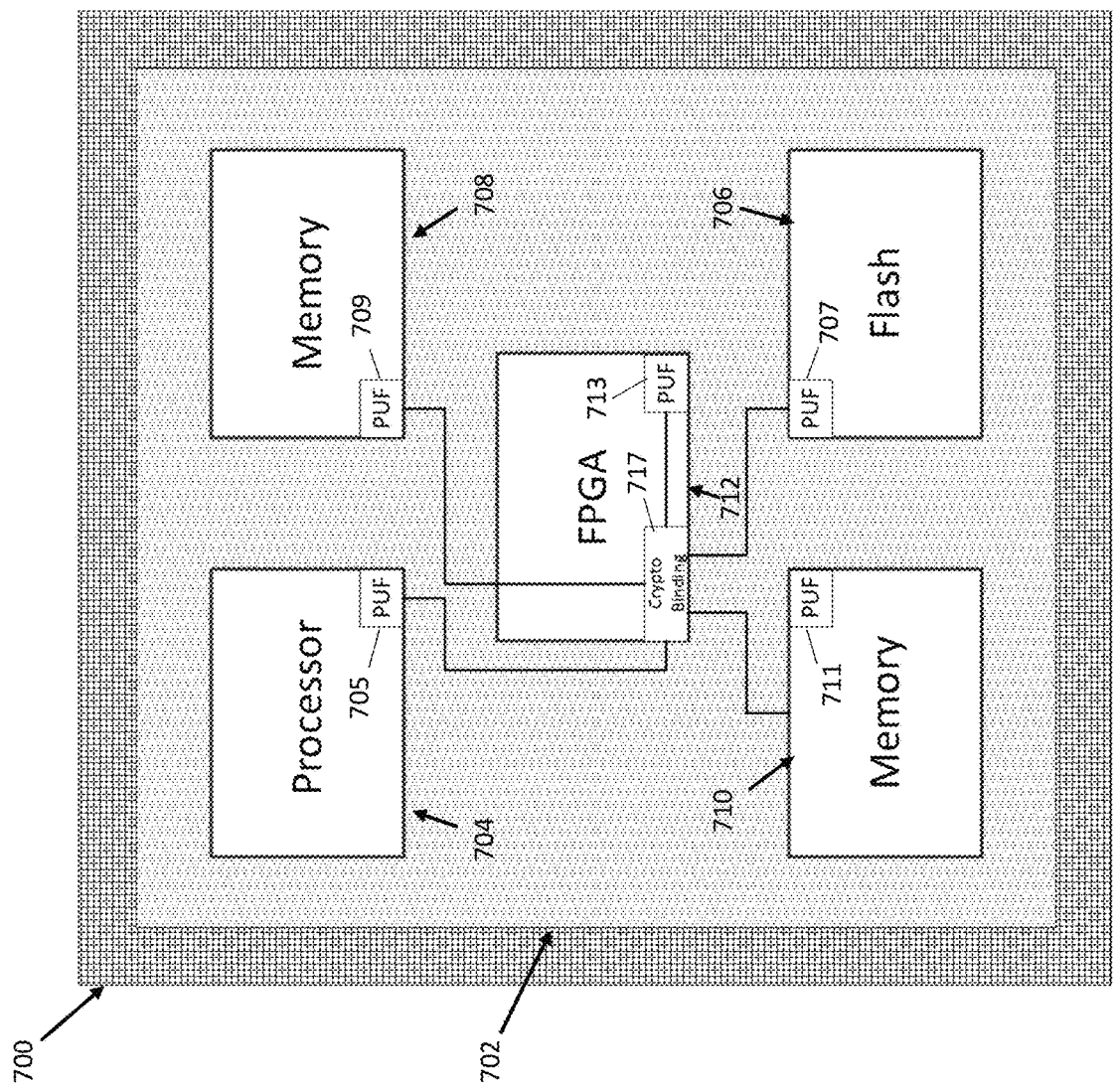
FIG. 5 is a block diagram illustrating a heterogeneous multi-die electronic device configured to produce multiple independent PUF responses use to generate a single unified PUF response according to a non-limiting embodiment.

With reference now to FIG. 5, a heterogeneous multi-die electronic device 700 is illustrated according to a non-limiting embodiment. The heterogeneous multi-die electronic device 700 is a SiP, which implements an interposer 702 configured to support several different types of dies 704, 706, 708, 710, and 712. The interposer 702 can include one or more substrate layers and can facilitate electrical interface routing between one die or connection to another. For example, the interposer 702 can facilitate an electrical interface connection between one or more of the dies 704, 706, 708, 710, and 712, or to an external packaging pin (not shown) included in the heterogeneous multi-die electronic device 700.

The different types of dies 704, 706, 708, 710, and 712 represent different types of devices. For example, a first die 704 can include a processor, a second die 706 can include a flash storage device (also referred to as flash memory), a third die 708 can include a first memory unit, a fourth die 710 can include a second memory unit, and a fifth die 712 can include a field programmable gate array (FPGA). Although the heterogeneous multi-die electronic device 700 is shown implementing five different types of dies 704, 706, 708, 710, and 712, it should be appreciated that the number of dies and/or the types of devices are not limited to those described herein. More or less dies and/or additional types of devices can be implemented in the heterogeneous multi-die electronic device 700 without departing from the scope of the present disclosure.

In one or more non-limiting embodiments, die 712 employing the FPGA is configured to generate the single unified PUF response based on the individual PUF responses provided by a combination of PUFs associated with the different dies 704, 706, 708, 710, and 712. Accordingly, die 712 employing the FPGA can be viewed as a primary die or primary device, while the remaining dies 704-710 can be viewed as secondary dies or secondary devices.

Each die 704, 706, 708, 710, and 712 includes a local PUF 705, 707, 709, 711 and 713 that is tailored for the type of device supported by its respective die 704, 706, 708, 710, and 712. In other words, the PUF 713 inside die 712 supporting the FPGA can be different than the PUF 705 inside die 704 supporting the processor, which can be different than the PUFs 709 and 711 inside dies 708 and 710, respectively, which support the memory units.

In one or more non-limiting embodiments, the local PUF 705 corresponding to the processor supported by die 704 can generate a local digital fingerprint based on variations associated with distribution errors within cache memory, variations in time delays associated with executing instructions and/or variations in time delays associated with propagating a carry in ripple carry address within an arithmetic logic unit (ALU). The local PUF 707 corresponding to the flash storage device supported by die 706 can generate a local digital fingerprint based on variations associated with errors that occur when one or more erased cells are unintentionally programmed during a program operation in flash memory, delay time in programming bits within flash memory, and/or position of un-erased bits within a sector of flash memory. The local PUFs 709 and 711 corresponding to the first memory unit 708 and second memory unit 711, respectively, can each generate a local digital fingerprint based on variations associated with startup values measured after power cycling Static random-access memory (SRAM) and/or bit-flip patterns measured during refresh-pause intervals while recharging dynamic random-access memory (DRAM) cells. The local PUF 713 corresponding to the FPGA supported by die 712 can generate a local digital fingerprint based on inherent manufacturing variations of the FPGA's signal traces, logic gates, switches, and/or LUTs. As described herein, the variations of the FPGA can be quantified by measuring the propagation delays along one or more combinational logic paths of the FPGA integrated circuits.

In one or more non-limiting embodiments, the FPGA included in die 712 includes a cryptographic binding module, referred to herein as a "cryptobinding module" 717. The cryptobinding module 717 can be constructed as an integrated circuit that is implemented in the FPGA. In other non-limiting embodiments, the cryptobinding module 717 can be implemented externally from the FPGA. For example, the cryptobinding module 717 can be located in the processor die 704 without departing from the scope of the invention.

The cryptobinding module 717 is in signal communication with the FPGA PUF 713, along with each local PUFs 705, 707, 709, and 711 included with each of the dies 704, 706, 708, 710, and 712. The cryptobinding module 717 is configured to receive the local PUF responses produced by each respective local PUF 705, 707, 709, 711, and 713 bind them together cryptographically to generate a single unified PUF response indicating the authenticity of the heterogeneous multi-die electronic device 700.

In one or more non-limiting embodiments, the cryptobinding module 717 is configured to concatenate each received local PUF response. Once concatenated, the cryptobinding module 717 applies a cryptographic function, such as a SHA-X function (e.g., SHA-0, SHA-1, SHA-2, SHA-3, etc.) for example, which cryptographically binds together all the local PUF responses into a single unified PUF response that can serve as a digital fingerprint indicating the authenticity of the heterogeneous multi-die electronic device 700. Although a SHA-X function is described, it should be appreciated that other types of hash function or cryptographic functions can be applied without departing from the scope of the present disclosure.

As described herein, various non-limiting embodiments provide a unified multi-die PUF. The unified multi-die PUF can be applied to either a homogenous multi-die electronic device such as a SiP, for example, which includes several dies of the same type or a heterogeneous multi-die electronic device including several different types of dies. In either case, the unified multi-die PUF improves the ability to establish component provenance and track their pedigree as the device moves through a supply chain to reduce the risk of counterfeit components getting integrated into the supply chain's finished product.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. A multi-die device comprising:
a first die including a plurality of first die signal path elements configured to propagate a plurality of stimulus signals including a first stimulus signal and a separate second stimulus signal different from the first stimulus signal;
a second die including a plurality of second die signal path elements configured to propagate the first and second stimulus signals; and
an interposer configured to establish signal communication between the first die and the second die so as to deliver the first and second stimulus signals from the plurality of first die signal path elements to the plurality of second die signal path elements to generate a propagation delay;

wherein the propagation delay is used to generate a single unified physical unclonable function (PUF) response that is indicative of the authenticity of the multi-die device.

2. The multi-die device of claim 1, wherein the first die and the second die are of the same type of die.

3. The multi-die device of claim 2, wherein the plurality of stimulus signals include a separate third stimulus signal that is different from the first and second stimulus signals, and wherein the plurality of first die signal path elements are different from the plurality of second die signal path elements.

4. The multi-die device of claim 3, wherein the single unified PUF response includes timing results generated according to the combination of the first die signal path elements and the second die path elements.

5. The multi-die device of claim 1, wherein the first die signal path elements and the second die signal path elements include at least one of a signal trace, a logic gate, a switch, and a look-up tables (LUT).

6. The multi-die device of claim 1, wherein:
the plurality of first die signal path elements are arranged in a first combination that establishes a first plurality of signal paths to propagate the plurality of stimulus signals; and
the plurality of second die signal path elements are arranged in a second combination different from the first combination, the second combination establishing a second plurality of signal paths different from the first plurality of signal paths to propagate the plurality of stimulus signals.

* * * * *